United States Patent [19]

Svensson

[11] Patent Number: 5,305,378
[45] Date of Patent: Apr. 19, 1994

[54] ARRANGEMENT FOR ADJUSTING AN ADAPTIVE DIGITAL FILTER INCLUDED IN A SUBSCRIBER UNIT

[75] Inventor: Lars T. E. Svensson, Eksätravägen, Sweden

[73] Assignee: Telefonaktiebolaget LM Ericsson, Stockholm, Sweden

[21] Appl. No.: 653,609

[22] Filed: Sep. 21, 1984

Related U.S. Application Data

[63] Continuation-in-part of Ser. No. 346,060, Jan. 22, 1982, abandoned.

[30] Foreign Application Priority Data

Jan. 7, 1980 [SE] Sweden ............................ 80048481

[51] Int. Cl.⁵ ............................................... H04B 3/03
[52] U.S. Cl. .................................. 379/404; 379/399; 379/400
[58] Field of Search ............... 379/398, 399, 402, 403, 379/404, 411, 377, 383

[56] References Cited

U.S. PATENT DOCUMENTS

| | | | |
|---|---|---|---|
| 3,919,502 | 11/1975 | Daryanani | 379/403 |
| 3,982,080 | 9/1976 | Ukeiley | 379/403 |
| 4,096,361 | 6/1978 | Crawford | 379/403 |
| 4,261,051 | 4/1981 | Ohnishi et al. | 379/340 |
| 4,275,276 | 6/1981 | Rizzo | 379/403 |
| 4,377,858 | 3/1983 | Treiber | 379/402 |
| 4,386,430 | 5/1983 | Treiber | 375/103 |
| 4,608,464 | 8/1986 | Morikawa et al. | 379/410 |

FOREIGN PATENT DOCUMENTS 5248949 10/1975 Japan.

Primary Examiner—James L. Dwyer
Assistant Examiner—Randall P. Myers
Attorney, Agent, or Firm—Ladas & Parry

[57] ABSTRACT

An arrangement for adjusting an adaptive digital balance filter included in a subscriber unit connected to a telephone line includes a selection unit, which can be connected to the subscriber unit either via the exchange or via a separately arranged switch. When the selection unit is connected to the subscriber unit, the balance filter is disconnected from both branches of the subscriber unit. A test signal generator is included in the selector unit for sending a signal on the lines via both branches of the subscriber unit. There is further included a plurality of digital filters wherein the transfer function of any of the filters closely coincides with the transfer function of the filter formed by the line impedance and the portion of the subscriber unit which is connected to the line and to the balance filter. By means of a measuring unit there is formed a criterion for determining which one of the filters included in the selector unit most closely matches the above-mentioned filter, and the parameters of the selected filter are allowed to determine the parameters of the balance filter.

8 Claims, 3 Drawing Sheets

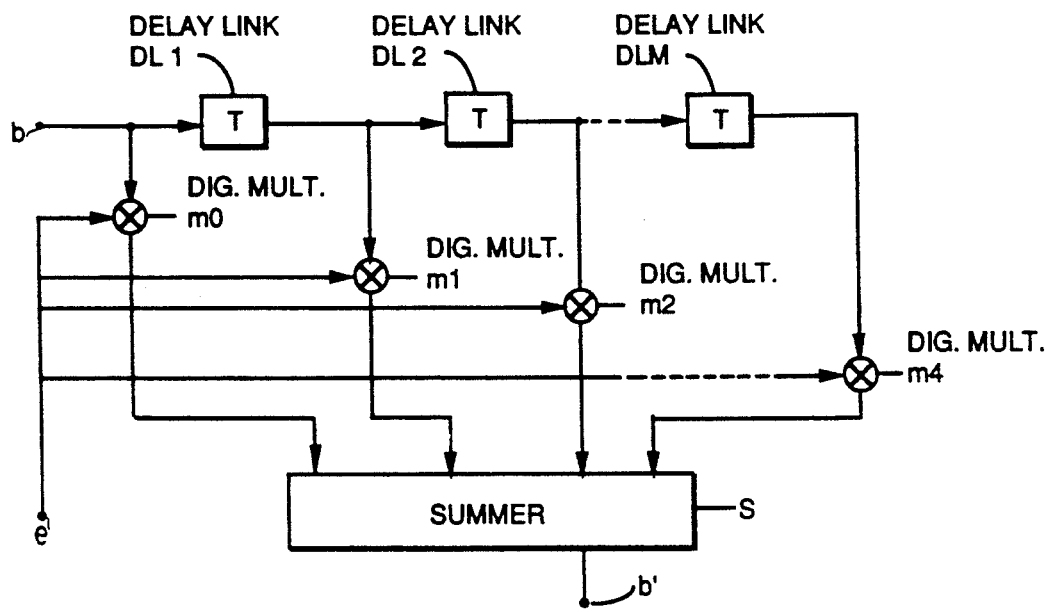
FIG. 2 FILTER B
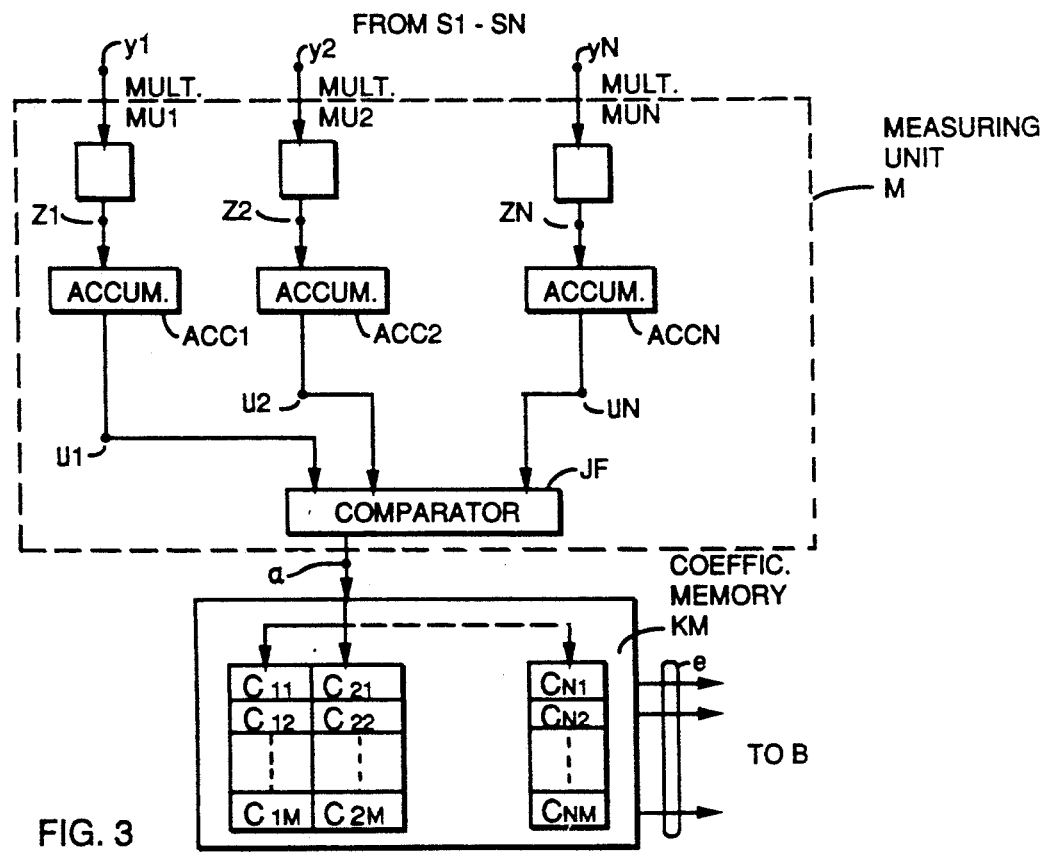
FIG. 3

ARRANGEMENT FOR ADJUSTING AN ADAPTIVE DIGITAL FILTER INCLUDED IN A SUBSCRIBER UNIT

OTHER APPLICATIONS

This application is a continuation-in-part of earlier filed copending application Ser. No. 346,060, filed Jan. 22, 1982 now abandoned.

FIELD OF INVENTION

The present invention relates to arrangements for adjusting an adaptive, digital filter balancing impedances included in subscriber units, said units being connected to common selector stages in telephone exchanges. Hereinafter, these filters will be referred to as "balance filters".

More specifically, the invention relates to arrangements such that the frequency characteristic of a digital balance filter included in a subscriber unit can be automatically varied in response to the frequency characteristic of the line impedance connected to the subscriber unit in a given connection, considered from the balance filter out towards the line or the line side.

BACKGROUND

In telecommunications and more specifically with respect to transmitting and connecting telephone calls from one subscriber to another, there is a need of separating the transmission directions with the aid of a fork constituted, for example, by a so-called hybrid circuit. This divides the incoming two-wire and two-directional line from a subscriber's set into a four-wire transmission circuit (i.e., a pair of two one-way connections) to enable the functions of signal conversion, filtering, amplification, and so forth which functions can only take place in only one direction.

When both two-wire subscriber terminals are connected together through a four-wire exchange, it is necessary that the attenuation in the four-wire loop (i.e., the loop including the hybrid circuit, both one-way four-wire paths and the exchange connection or switching stage) exceed a certain value for the avoidance of stability problems. One possibility is to arrange attenuation in the exchange switching stage, but this results in unnecessary attenuation of the signals which are to be passed through.

To obtain a sufficiently high so-called cross fork attenuation with the object of avoiding the above-mentioned stability problems, and thus obtain sufficient signal separation in the hybrid circuit, the balance impedance must accurately match the impedance in the line currently connected to the exchange via the subscriber unit. It is therefore impossible to use the same balance impedance for all subscribers, since, relative to the hybrid circuit, there can be considerable scattering of the input impedances to the different subscriber lines.

U.S. Pat. No. 3,982,080 teaches automatically adjusting the value of the balance impedance of a hybrid circuit in response to the impedance value of a given line amongst a plurality of available lines for achieving optimum impedance match between a hybrid circuit and the associated line.

SUMMARY OF INVENTION

An object of the invention is to provide improved arrangements for adjusting impedance in a telephone subscriber unit or the like.

Another object of the present invention is to provide an arrangement for adjusting the balance impedance in a subscriber unit of the kind mentioned above, in the case where the balance impedance comprises a digital filter, the frequency characteristic of which can be conventionally varied by varying the parameters supplied to the filter. The proposed arrangement can thus be set up at a central point, e.g. in close connection to the exchange switching stage, so that it can be individually utilized by several subscribers.

To achieve the above and other objects of the invention, there is provided an improvement in an arrangement for adjusting an adaptive digital filter balancing impedance, included in each of a plurality of subscriber units connected to a telephone exchange, in accordance with the impedance of a line connected to one of said subscriber units wherein each said unit includes, apart from one said balance filter a two-wire to four-wire transfer circuit between an incoming two-wire line and a four-wire line having two two-wire unidirectional paths, a switch for connecting and disconnecting the balance filter between the said unidirectional paths, filter units and a converter unit in each of said paths, and a switching unit connected to each of the two-wire unidirectional paths for connecting a selection unit to one of said subscriber units simultaneously as the balance filter is disconnected from said unidirectional paths.

In accordance with the invention, the aforesaid improvement comprises a test signal generator for transmitting a periodic test signal in digital form containing at least one tone frequency through a loop including one of said unidirectional paths, the subscriber line and the other of the unidirectional paths. The improvement moreover includes a filter bank containing N digital filters connected in parallel for receiving a signal corresponding to the test signal appearing across the input of said balance filter, each filter in said filter bank having a transfer function corresponding to an equivalent transfer function formed by the line impedance of each of at least N lines connected to each of said plurality of subscriber units, and by said transfer circuit together with the converter and filter units in said unidirectional paths which are connected between the balance filter and the transfer circuit. Moreover there is provided a plurality of N summing circuits for summing the test signal which has gone through said loop with the same test signal filtered in the filter in said filter bank in order to obtain summation signals. There is also provided a measuring unit connected to the outputs of the summing circuits for measuring the summation signals giving corresponding measuring results, comparing each of said measuring results with one another and selecting the order number ($n \leq N$) of the summing circuit giving the summation signal as a result of the comparing which corresponds to the output signal from the filter in the filter bank which best matches said transfer function, an address signal corresponding to the order number being delivered. Furthermore there is provided a memory unit storing a plurality of filter parameter groups each corresponding to the parameters of each filter in the filter bank and which, in dependence on said address signal obtained from the measuring means, transmits signals to the balance filter representing a certain group of said parameter groups corresponding to said order number.

According to a further feature of the invention, the measuring unit includes an arrangement for measuring the energy of said summation signals to give the measuring results and a comparison arrangement for carrying out the comparing of the measuring results, the order number being selected from one of the results which indicate the least energy of the summation signals.

According to still another feature of the invention, there is provided in the measuring unit a plurality of multipliers for forming the square of the signals given by the summing circuit and a plurality of accumulator circuits for summing the signals obtained from the multiplier circuits during a time corresponding to a plurality of periods of the periodic test signal, said comparator arrangement comparing the output signals from the accumulator circuits and giving the address signal to the memory unit for selecting one of the parameter groups in the memory unit which corresponds to the order number.

Yet another feature of the invention relates to the provision of filters in the filter bank which comprise a digital transversal filter containing delay links, the input of the filter as well as the output of each of the delay links being connected to digital multipliers, with fixed multiplying values determined from the impedance value of the subscriber lines connected to the subscriber units, the outputs of the multipliers being connected to a summing circuit having an output which forms one output of the filter bank.

The above and other objects, features and advantages of the invention will be found in the detailed description which follows herein below as illustrated in the accompanying drawings.

BRIEF DESCRIPTION OF DRAWINGS

The invention will next be described in detail with reference to the appended drawings in which:

FIG. 2 illustrates a digital filter included as a balance filter in the subscriber unit according to FIG. 1;

FIG. 3 is a block diagram of a measuring unit and a memory unit included in the selector unit according to FIG. 1;

DETAILED DESCRIPTION

Figure 1:
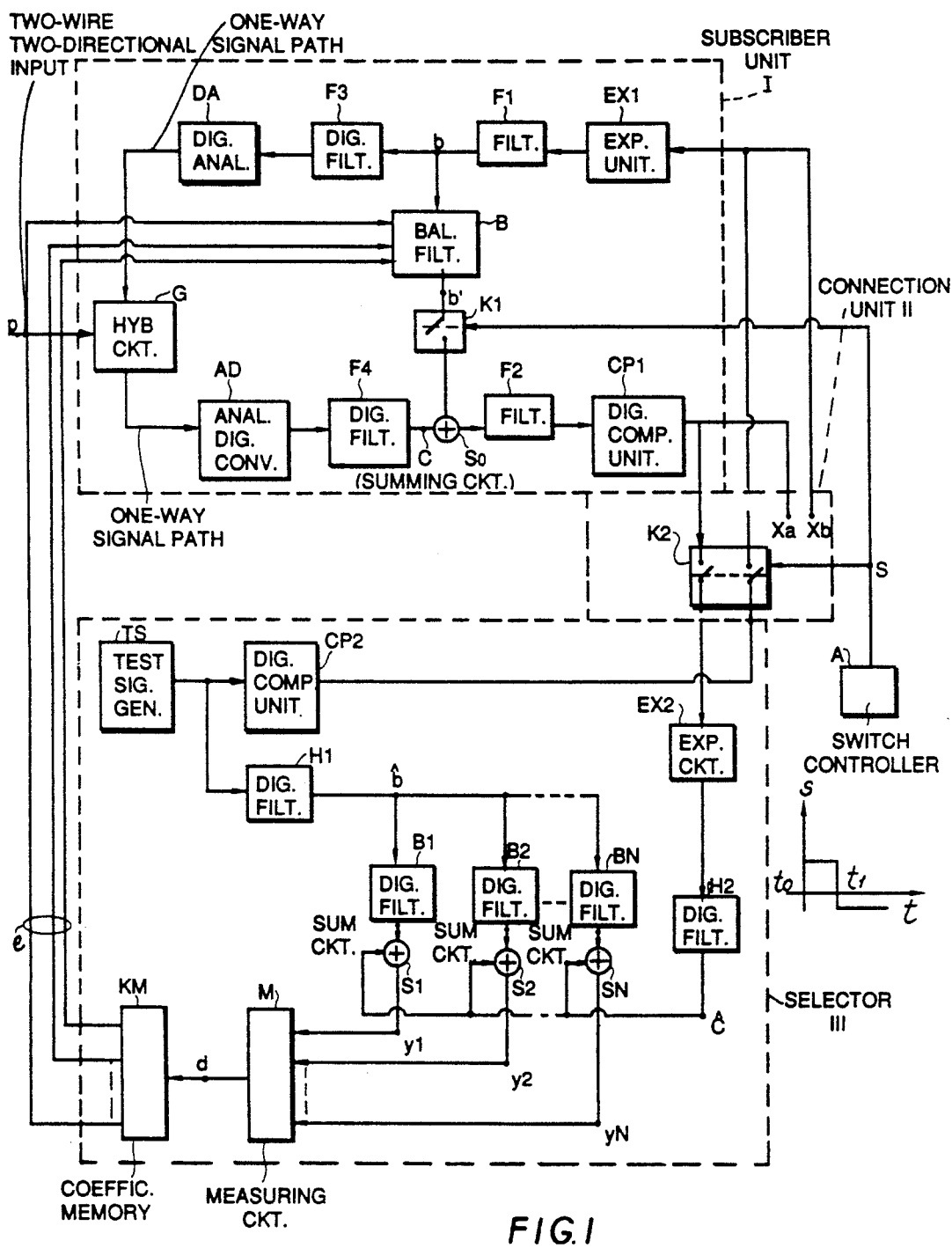
FIG. 1 is a block diagram of an arrangement according to the invention in relation to a telephone subscriber unit.

The block diagram of FIG. 1 includes a subscriber unit I, a connection unit II included in a telephone exchange and a selection or selector unit III. The subscriber unit I is of known circuitry and contains a hybrid circuit G, the input of which consists of a two-wire two-directional connection from a subscriber's set connected to the unit I. The hybrid circuit G is of known circuitry and has the task of dividing the signals across the two-wire connection into two one-way signal paths, but does not contain the balance impedance of the conventional circuits. One signal path includes an analogue/digital converter AD and a digital filter F4, while the second signal path contains a digital/analog converter DA and a digital filter F3. The hybrid circuit line input is denoted by P. Both signal paths are connected via a balance filter B, which corresponds to the balance impedance in known hybrid circuits, and via a summing circuit So. The loop G, AD, F4, SO, B, F3 and DA thus formed constitutes the hybrid circuit proper incorporated in the subscriber unit I. If the attenuation in the units F3, DA and G and to the subscriber across the line is $A_1$ and the attenuation from the subscriber across the line and in the units G, AD and F4 is A2, then the attenuation A3 in the loop is such that A3-A1-A2>0. Signals from the converter DA in the second signal path must be balanced out by the signals form the balance filter B and the summing circuit SO, said signals passing the hybrid circuit G and reaching the first signal path as well as being fed out to the line and reflected back again. In a mode already known, the converter AD converts incoming analogue speech signals from the hybrid circuit G to PCM-coded signals; i.e., into digital signals in the form of binary pulses. The converter DA receives such pulses and converts them to analogue signals, which are sent back to the subscriber after having passed through the hybrid circuit G.

In the present subscriber circuit, a plurality of filters F1, F2, F3 and F4 are provided for band limitation of the signals in both signal paths to the prescribed frequency band (e.g., 0-4 kHz) which corresponds to a speech band, and comprise digital filter links of a known kind. The A-D and D-A conversion suitably takes place at a higher sampling frequency (e.g., 512 kHz) than that used in the following selector. Apart from band limitation, the task of the filters is then to adjust the sampling frequency in the AD and DA converters to the lower sampling frequency (8 kHz) of the selector. The filter function has thus been divided so that the filters F1 and F3 are connected to one branch for outgoing signals from the subscriber unit, and the filters F2 and F4 for incoming signals.

The balance filter B is of digital type and has its input connected between the filters F1 and F3, and its output connected to one input of summing circuit So via a controllable switch K1. The other input of the summing circuit So is connected to the output of filter F4, and its output is connected to the input of filter F2. Filters F1 and F2 consist of two substantially similar filters of recursive type, while filters F3 and F4 are transversal filters of substantially the same appearance. A digital compressor unit CP1 and an expander unit EX1 are connected to the respective filters F2, F1 for compressing outgoing signals from filter F2 and expanding incoming signals to the filter F1.

The signals appearing across the terminals Xa and Xb (which are those respectively fed out from the compressor unit CP1 and fed to the expander unit EX1) constitute the speech signals which are through-connected in PCM-coded binary form in the following exchange. The block II symbolizes a switching means in the exchange for passing through the signals obtained from the subscriber unit I and received from the selector unit III. The switch K2 is preferably incorporated in the existing selector unit III. The switch K2 is preferably incorporated in the existing selector circuit of the telephone exchange, as a common connecting means (e.g., for the tone signals to the exchange), the connecting means being in the open position for connected calls. Alternatively, as has been shown in FIG. 1 for the sake of clarity, the switch can comprise a unit separate from the other connecting units in the exchange, this unit being activated by the central processor of the exchange only when the selection unit III is to operate, when it passes through the signals from the subscriber unit I to the selector unit III. When the switch K2 is in the closed position, and the selector unit III is thus connected, the switch K1 is controlled so that it is open for disconnecting the balance filter B. In the reverse situation, when the selector unit III is disconnected (the switch K2 open), the balance filter B is connected (connected call). Switches K1 and K2 are operatively connected to switch controller A.

According to the invention, selector unit III is thus arranged in the exchange such that for an off-the-hook condition of a subscriber'set, the unit II is connected to the subscriber unit I associated with the subscriber. In accordance with the inventive concept, the selector unit is arranged such that it can serve several subscriber units connected to the common exchange. However, for the sake of clarity, only one switch K2 and one subscriber unit I have been shown in FIG.1, but it will be understood that several subscriber units can be arranged via further switches in the exchange switching stage II for connection to the selector unit III. For this it is only required that the switch K2 is controlled from the exchange processor unit such that when the subscriber unit I according to FIG. 1 is not activated, the switch K2 is open, while the corresponding switch associated with an activated unit I (not shown in FIG. 1) is closed.

The unit III contains a test signal generator TS, which sends a test signal in digital form; e.g., a low-frequency sinusoidal signal coded in agreement with the conversion of the speech signals in the subscriber unit I. A digital compressor unit CP2, of the same kind as the compressor unit CP1, is connected between the output of the test signal generator TS and the input of the switch K2. A digital filter H1 is further connected to the output of the test signal generator, the filter being dimensioned such that for the test signal frequency it is similar to filter F1 in the subscriber unit I. More specifically, if the transfer functions for the filters F1 and H1 are $$F_1(f) = A_1(f) \cdot e^{j\phi_1(f)}$$

and $$H_1(f) = C_1(f) \cdot e^{j\theta_1(f)}$$

then $$A_1(fo) = C_1(fo)$$

and $$\phi_1(fo) = \theta_1(fo)$$

where fo is the test signal frequency.

The output of the filter H1 is connected to a filter bank. This contains N digital filters B1 ... BN having mutually similar construction but different characteristics corresponding to the characteristic of the transfer function "seen" towards the two-wire line from the terminals b, b' of the balance filter B. The number N is not necessarily the same as the number of subscriber lines, but a filter $B_j$ can correspond to several lines. One input of a plurality of summing circuits S1 ... SN is connected to the out of each filter B1 ... BN. The second input of these summing circuits S1 ... SN is connected to the switch K2 via a digital filter H2 and an expander circuit EX2. The filter H2 is dimensioned such that it imitates the inverse transfer function of the filter F2 for the test signal frequency; i.e., the transfer function of the filters F2 and H2 is $$F_2(f) = A_2(f) \cdot e^{j\phi_2(f)}$$

and $$H_2(f) = C_2(f) \cdot e^{j\theta_2(f)} \text{ respectively}$$

then $$A_2(fo) = 1/C_2(fo) \text{ and } \phi_2(fo) = -\theta_2(fo),$$

where fo = test signal frequency.

Together with the compressor unit CP1 (as well as the units CP2 and EX2), the expander circuit EX1 conventionally forms a companding unit to reduce quantization distortion of the PCM coding in the subscriber unit I.

The outputs of summing circuits S1 ... SN are connected to a measuring circuit M. This measures the energy of the output signals $y_1 ... y_N$ from the summing circuits S1 ... SN by forming the mean square value of each of the signals $X_1 ... X_N$ during a suitable time interval (e.g., a test signal period 1/fo) and is connected to the address input of a coefficient memory KM. This memory can be a ROM in which the coefficients or parameters of each of the filters B1 ... BN are stored (this will be described in detail later on). The signal $y_k$ of the signals $y_1 ... y_N$ coming to, and measured by the unit M, and which has the least mean square value (i.e., the least energy) gives an address signal from the measuring circuit M to the coefficient memory KM. The latter is connected to the control input of the balance filter B in the subscriber unit for feeding the selected parameter or coefficient array to this filter.

Before the function of the selection unit is described, FIG. 2 will next be described in detail. FIG. 2 illustrates one form for the balance filter B. The input b to the filter B is connected to a plurality of delay links DL1 ... DLM. The inputs of each delay link, as well as the output of the last link DLM are connected to a plurality of controllable digital multipliers $m_o ... m_M$, and the outputs thereof are connected to a summer S. Each delay link DL1 ... DLM has a delay determined by the sampling rate of the incoming signals to the filter B (e.g., 16 kHz) if the sampling rate of the signals coming from the exchange is multiplied by a factor of 2 in the filter F1. The control inputs of the multipliers are connected to the N outputs of the coefficient memory KM in the selector unit III. The filter B thus constitutes an adaptive transversal filter, obtaining control signals from a memory unit KM to give an array of coefficients, whereby the required filter characteristic of the filter B is obtained. Determining of the coefficient array required for the filter B to give the best balancing for a given subscriber line is executed by the selection unit III.

When the subscriber's telephone set is in the off-hook condition, a signal is sent to the exchange such that the selector unit III is connected to the subscriber station I via the switch K2. The switch K1 is controlled such that it is simultaneously open. The test signal generator TS transmits a sampled sinusoidal test signal (e.g., the connecting tone in a sample form) which is compressed in the unit CP2 and expanded in the unit EX1 according to a prescribed compander law. The attenuation and phase shift of the test signal are the same in the filters F1 and H1. The signals appearing at the points b and b' are thus substantially the same. The signal at the point b continues across the filter F3, converter DA, hybrid circuit G and subscriber line and is reflected back to the subscriber telephone set across the line, hybrid circuit G, converter AD and filter F4 to the point c. The signal path from the point b through said units and line to the point c are thus equivalent with a filter F, to the transfer function $F(f) = F_1(f) \cdot e^{j\Psi(f)}$ which is similar to the transfer function B(f) of the balanced filter, but with reverse sign. If the signal applied to the input of the balance filter B and filter F3 is denoted by x(t) with the frequency function X(f) and the output signal from the summing circuit So is denoted by y(t) with the frequency function Y(f) then $$Y(f) = X(f)[F(f) + B(f)],$$

where F(f) and B(f) are the transfer functions for the equivalent filter F and the balance filter B, respectively.

When the switch K1 is open (i.e., the switch K2 is closed) then from the signalling point of view the points b, c are equal to the points $\hat{b}$, $\hat{c}$. The signal at point $\hat{c}$ is approximately the same as y(t). Each of the filters B1 . . . BN, constituting the filter bank in the selection unit III, has been dimensioned so that they are as closely as possible similar to the equivalent filter F, according to the above, for a certain number of lines. Thus, each filter $B_k$ (k=1, . . . , N) and each summing circuit $S_k$ (k=1, . . . , N) in the selector unit III corresponds to the balance filter B and summing circuit So, respectively, So that equilizing of the signals shall take place in the summing circuit So (when the switch K1 is closed and K2 opened) the signal $Y(f) = X(f)[F(f) + B(f)]$ should be as small as possible (i.e., the factor [F(f)+B(f)] should be as small as possible) which implies that the balance filter matches the line impedance. The signal $y_k(t)$ can therefore be taken as a measure of how closely the transfer function of one of the filters B1 . . . BN is similar to the transfer function of the equivalent filter F with reverse sign.

The least value of [F(f)+B(f)] is consequently determined in the selection unit III by determining the value of k (k=1, . . . , N) of the signal $y_k(t)$ which has the least energy. The energy of the signal $y_k(t)$ from the summing circuit $S_k$ can be denoted by: $\zeta|y_k(t)|^2 dt = \zeta|y_k(f)|^2 df = \zeta|X(f)|^2|F(f) + B_k(f)|^2 df$; i.e. the factor $|F(f) + B_k(f)|^2$ is at least when $\zeta|y_k(t)|^2 dt$ at least. The measuring unit M therefore forms a means square value of all output signals from the summing circuits S1 . . . SN, and a signal across its output $\hat{e}$ is transmitted to the coefficient memory KM which gives the order number k of the filter $B_K$, for which is obtained the lowest energy of the signal $y_k(t)$ across the output of the associated summing circuit $S_K$. The output signal from the unit M is a binary address information to the coefficient memory KM, which selects in this memory the coefficient array $C_{kM}$ associated with the filter $B_k$. Associated coefficients are then fed from the memory KM (e.g., in parallel form,) to the multiplier circuits $m_o$–$m_M$ in the balance filter B.

The filters B1 . . . BN are suitably implemented as digital transversal filters of the same kind as the balance filter according to FIG. 2, with the difference that the digital multipliers in the filters B1 . . . BN are not variable but have fixed multiplying values, calculated by measuring the line impedance values for the subscriber lines which are connected to the exchange.

The measuring unit M and the subsequent coefficient memory KM are illustrated in greater detail in FIG. 3. The measuring unit contains N multipliers MU1 . . . MUN, the inputs of which form the N inputs of the unit M. Each multiplier forms the square of an incoming signal $y_i$ to give a value $z_i = y_i^2$ at the output. An accumulator circuit ACC1 . . . ACCN is connected to each multiplier output for summing the squared sample values for each $Z_i$ signal; e.g., during a time corresponding to the period of the sinusoidal test signal from the generator TS. A comparator circuit JF compares the thus formed values $$u_i = \overset{T}{\Sigma} z(t_k) = \overset{T}{\Sigma} y_i^2(t_k);$$

(i=1, . . . , N) and gives an address signal in binary form at k=o its output, giving the order number i of the signal with the least value.

The coefficient memory KM comprises, for example, an addressable ROM memory in which the coefficients $C_{ik}$ (i=1, . . . , N k=1, . . . M) are stored of the N filters B1 . . . BN. Addressing from the measuring unit M causes the selected coefficients to be transferred in parallel form to the multipliers $m_o$ . . . $m_M$ in the balance filter B in the mode described above.

The arrangement in accordance with the invention can naturally be modified within the scope of the inventive concept. For example, the test signal generator can send a signal containing two frequencies, one in the lower and the other in the upper range of the speech band. This is suitable in the cases where pupinized lines are used. The transfer functions for the filters F1, H1 and F2, H2 must then satisfy the relationships given above for both these frequencies.

A suitable sampling rate in the filter B is determined by the filters F1, F3 in the first signal path and the filters F2, F4 in the second. As an example, it has been assumed above that the sampling rate in the converters DA and AD is 512 kHz and that the filters F3, F4 adjust the sampling frequency to 16 kHz in the filter B. Alternatively, the filter B can operate at a greater rate, and in the extreme case be directly connected to the input of the converter DA or the output of the converter AD (via the summing circuit So), or at a lower rate by connection to the input of the filter F1 or the output F2, the sampling rate then being 8 kHz.

The parallel connection of the filters B1 . . . BN in the filter bank is advantageous, since possible disturbance signals from the subscriber than have the same effect on all the filter signals on summing in the summing circuits S1 . . . SN.

Finally, it is not necessary to select as a criterion of the best adjustment of the filter B to the line impedance the output signal from the summing circuits S1 . . . SN which has the least energy. It is also possible to form the absolute value of the signal y(t) and use the least value of this as a criterion.

Figure 4:
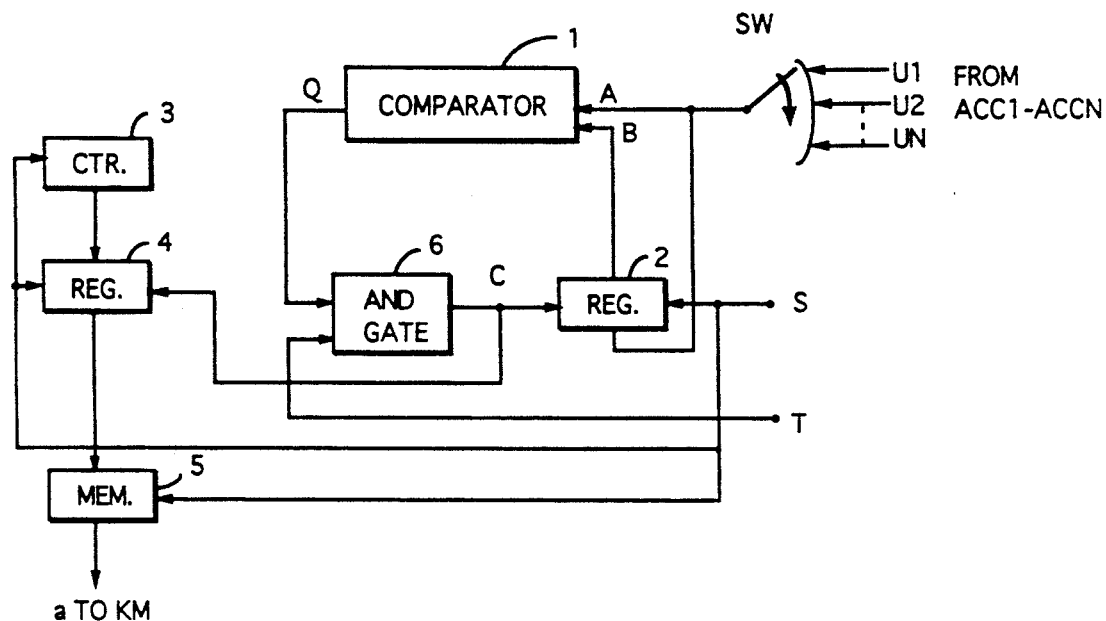
FIG. 4 is a block diagram of a comparator employed in the circuitry of FIG. 3.

FIG. 4 shows a preferred form of the comparator JF employed in FIG. 3. It includes a comparator 1 with two inputs A and B and an output Q. Input A is connected to the output of a controllable switch SW whose N inputs receive the output signals U1-UN from the accumulators ACC1-ACCN. A first register 2 having the same word length (for example, 8 bits) as the word length of signal values U1-UN has one input connected to the output of the switch SW to receive each of the signal values U1-UN in a sequence determined by the switch SW. An input S is connected to an input of register 2 and provides zero-setting signals after N steps of switch SW. One output of register 2 is connected to the input B of comparator 1 to deliver some of the values U1-UN timely with a signal from an output C of an AND-gate 6. If output C is "1", the value in register 2 is fed to input B and if output C is "0", the value in register 2 is stored until output C again is "1". The gate 6 has one input connected to the output Q of the comparator 1 and across the second input T timing pulses are delivered. Zero-setting pulses across S and timing pulses across T can be created in known manner by a common clock (not shown).

A counter 3 counting in sequence the order numbers 0, 1, 2, . . . , N during one cycle has an output connected to an input of a second register 4 controlled by the pulses from output C of gate 6. Counter 3 and register 4 are zero-set by pulses from input S via zero-setting inputs each, and when a counting cycle is ended (N). A memory 5 has its input connected to the output of register 4 and stores a number of address values which can be pointed out by input signals from register 4. This register thus delivers a signal indicating a certain order number k (k=0,1,2, . . . ,N) but a certain order number k can be frozen across its output in dependence on the state of output C connected to an inhibiting input of register 4. If output C is "1" no inhibiting takes place, but if C is "0" register output is inhibted giving a certain order number k in spite of the input counting pulses from counter 3. Order number k from register 4 points out a certain address stored in memory 5 has obtained a zero setting signal from input S.

Figure 5:
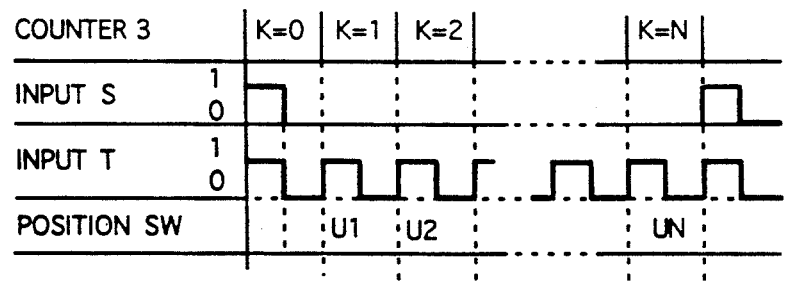
FIG. 5 is a signal chart showing the operation of the comparator of FIG. 4.

The operation of the comparator of FIG. 4 is next described with reference to the signal chart in FIG. 5.

For starting a cycle (k=0), a signal pulse across input S zero-sets counter 3 and the second register 4, and enables the first register 2 to be loaded with an initial value $U_{max}$ greater than any possible value $U_k$ (k=1, . . . ,N). In the time interval for k=1, value U1 is fed to input A of comparator 1 and $U_{max}$ to input B (output C=1), a comparison being carried out in comparator 1. Since $U_{max}>U1$, output Q is set at "1" and thus gate 6 delivers a "1" to register 2 and to register 4. This implies that $U_{max}$ is replaced by U1 and register 4 is stepped to order number 1. In the next time interval k=2, value U2 is fed to input A, and value U1 appears across input B, since there is no inhibiting of value U1. If U1>U2 the above conditions are repeated, output C delivers "1" which cancels value U1 and register 2 is prepared to receive value U2 during k=3. Input B receives value U3 and again a comparison now between U2 and U3 is effected.

Assuming that U3>U2 (i.e., U2 is the lesser value) implies that output Q is set at "0" and thus output C is set at "0" which implies that value U2 is stored in register 2. During this, counter 3 has counted to k=3 but register 4 has stopped with order number 2 since output C delivers a "0" for k=3. Assuming further that U4>U2, output C will still be at "0" implying that register 2 still stores U2. Register 4 is inhibited by output C set to "0" although counter 3 now delivers counting pulse 4. Thus:

a) register 2 stores value U2 although value U4 in the next interval k=4 is fed to this register from switch SW. A comparison is next made in the interval k=5 between U5 and U2.

b) output C set to "0" does not enable register 4 to assume any order number greater than k=2 although counter 3 will deliver pulses with order number 3,4 and so on to register 4. Thus register 4 points out an address in memory 5 corresponding to value U2, i.e. order number k=2, but counter 3 nevertheless causes the register 4 to be stepped forward to a greater order number as soon as output C again is set to "1".

If value U2 is the absolute lesser value during the whole cycle k−O=N, the address corresponding to value U2 will be fed out from memory 5 upon application of an activating pulse across input S.

Assuming that value U2 was not the absolute lesser value, this instead being value U10, counter 3 has delivered counting pulses to register 4 up to k=10. Since output C then must be set to "1" (U10<U2), order number 10 is fed to memory 5, pointing out the address with order number 10 and this address will be fed out from memory 5 upon an activating pulse across S when k=N.

In the above description, each of the filters B1-BN in the filter bank has the same structure as that of the balance filter B shown in FIG. 2. Determining the values of the fixed multiplying factors in each filter is well known in this technical area and is not in and of itself a part of the present invention. Concerning filter coefficients, reference is made to the book "Theory and Application of Digital Signal Processing" by Rabiner and Gold in which on pages 513-514, particularly FIG. 8.27, an example of a coefficient memory is shown which can be used as the memory KM herein.

Generation of an address signal to select or read out of memory KM is explained in FIG. 3. The signal across output a of the comparator unit JF is a binary signal in series or parallel form and constitutes an address signal to the subsequent coefficient memory KM to select the appropriate coefficient set stored in this memory for transmission to balance filter B. This technique is in itself quite conventional and can easily be realized by a person of oridinary skill in the art.

In order to determine the values for the coefficient memory, one can take the system shown in FIG. 1 and disconnect the coefficient memory KM therefrom. One then can connect to the leads e that normally come from the output of the coefficient memory to a digital (binary) number generator. One also would connect to the output of the measuring circuit M a device for reading digital values. Then, one would select a typical set of load impedances, this set covering the range of impedance values adopted by the subscriber lines.

Then systematically each one of the load impedances is connected to the input p. The number generator is set to zeros and the digital value at the output of the measuring circuit M is noted. This digital value will be to address the coefficient for the particular load impedance under consideration. Then one would start monitoring the signal at the output of the summing circuit So and while monitoring such output the number generator would be stepped to generate successive binary numbers. When a minimum value is noted in the output of the summing circuit So, the number being transmitted by the number generator is noted. This now becomes the actual coefficient for the value of impedance then attached to input p. There is now known the value of the coefficient and the address where this coefficient is to be stored. The routine is continued for each one of the load impedances. At the end of the routine, there has been amassed a required set of coefficients and the addresses where these coefficients can be stored. One can then suitably "burn" the coefficient into the designated addresses of coefficient memory KM using conventional PROM techniques.

This way, the coefficients are determined experimentally, on the other hand, it is also possible to calculate the conventional transfer function to obtain the set of coefficients which are then burned of a PROM memory.

There will now be obvious to those skilled in the art, many modifications and variations of the above circuitry. These modifications and variations will not depart from the scope of the invention as defined by the following claims.

What is claimed is:

1. Apparatus for adjusting an adaptive digital filter balancing impedance (B) in a subscriber unit (I) connected to a telephone exchange, in response to the impedance of a two-wire subscriber line connected to the subscriber unit, said unit including a two-wire to four-wire transfer circuit (G) connected to said incoming two-wire subscriber line, first and second four-wire branches connected to said transfer circuit (G), a switch (K1) for connecting and disconnecting said digital filter balancing impedance (B) between said first and second branches, first filter units (F1, F3) and a digital/analog converter (DA) in said first branch, and second filter units (F2, F4) and an analog/digital converter (AD) in said second branch; a selection unit (III), a switching unit (II) connected to both said four-wire branches for connecting said selection unit (III) to said subscriber unit (I) simultaneously as said digital filter balancing impedance (B) is disconnected by said switch from said branches, said selection unit (III) comprising:

a) a test signal generator (TS) for transmitting a periodic test signal in digital form containing at least one tone frequency ($f_o$) across a loop containing said first four-wire branch, the subscriber line and said second four-wire branch, b) a filter bank containing N digital filters (B1...BN) connected in parallel for receiving said test signal corresponding to the signal across an input of said digital filter balancing impedance, each said filter in the filter bank having a transfer function corresponding to a transfer function of an equivalent filter (F) formed by the line impedance of each of at least N lines, which are connected to the subscriber unit (I) and to the part of said loop which is connected to said digital filter balancing impedance (B), c) a plurality of N summing circuits (S1...SN) for summing the test signal which has gone through said loop with the same test signal filtered in a respective one of said digital filters in said filter bank, d) a measuring unit (M) for forming a value measured and calculated from signals (y1...yN) obtained from said summing circuits (S1...SN) with relation to one (Bk) of said digital filters (B1...BN) in said filter bank, said value indicating one of said N digital filters whose transfer function best matches the transfer function of said equivalent filter (F), and e) a memory unit (KM) storing a plurality of filter parameters ($c_{ij}$) corresponding to the parameters of each of said digital filters in the filter bank and which, in dependence on an address signal (d) obtained from the measuring unit (M), transmits signals to said digital filter balancing impedance (B) corresponding to the parameters of said digital filters in the filter bank, the output signal of which corresponds to said value formed in the measuring unit.

2. Apparatus as claimed in claim 1, wherein the measuring unit (M) includes a means which forms said value by measuring the energy of the signals (y1...yN) obtained from the summing circuits (S1...SN), the order number K<N for the filter among the N digital filters in the filter bank giving the signal (yk) having the least energy being determined in order to select the associated filter parameters ($c_{ij}$) in the memory unit (KM).

3. Apparatus as claimed in claim 2, wherein the measuring unit (M) includes a plurality of N multipliers (MU1...MUN) for forming the square of the signals (Y1...yN) given by the summing circuits (S1...SN), a plurality N of accumulator circuits (ACC1...ACCN) for summing the signals (z1...zN) obtained from the multiplier circuits during a time corresponding to a plurality of periods of a periodic test signal, and a comparator circuit (JF) coupled to and comparing the output signals (u1...uN) from the accumulator circuits and giving an address signal to the memory unit (KM), which selects said associated parameters ($c_{ij}$) in the memory unit corresponding to said value formed in the measuring unit (M).

4. Apparatus as claimed in claim 3, wherein said digital filter balancing impedance comprises a digital transversal filter including M delay links (DL1...DLM), the input of said digital filter balancing impedance as well as the output of each of the delay links being connected to controllable digital multipliers (mo...mM), which receive said signals from said memory unit (KM) across respective control inputs, the digital multipliers including outputs connected to a summator (S) the output of which forms the output of said digital filter balance impedance.

5. In an arrangement for adjusting an adaptive digital filter balancing impedance included in each of a plurality of subscriber units (I), commonly connected to a telephone exchange, in response to the impedance of a two-wire line connected to a respective one of the subscriber units (I) wherein each said unit includes a digital filter balancing impedance (B), a two-wire to four-wire transfer circuit (G) connected to an incoming two-wire subscriber line, a four-wire line having two two-wire unidirectional paths connected to said transfer circuit (G), a switch (K1) for connecting and disconnecting said digital filter balancing impedance (B) between said unidirectional paths, first filter units F1, F3 and a digital/analog converter (DA) in one of said unidirectional paths, second filter units (F2, F4) and an analog/digital convertor (AD) in the other of said unidirectional paths, a selection unit III, and a switching unit (II) connected to each of the two-wire paths for connecting said selection unit (III) to one of said subscriber units (I) simultaneously as said digital filter balancing impedance (B) is disconnected from said unidirectional paths, the improvement in which said selection unit III comprises:

a) a test signal generator (TS) for transmitting a periodic test signal in digital form containing at least one tone frequency ($f_o$) through a loop including said one of said unidirectional paths, the subscriber line and said other unidirectional path; b) a filter bank containing N digital filters (B1-BN) connected in parallel for receiving a signal corresponding to the test signal across an input of said digital filter balancing impedance (B), each said digital filter in said bank having a transfer function corresponding to an equivalent transfer function formed by the line impedance of each of at least N lines connected to each of said plurality of subscriber units (I) and by said transfer circuit (G) together with the converter and filter units in said unidirectional paths which are connected between the digital filter balancing impedance (B) and the transfer circuit (G); c) a plurality of N summing circuits (S1-SN) for summing the test signal which has gone through said loop with the same test signal filtered in a respective one of said digital filters (B1-BN) in said filter bank, in order to obtain summation signals ($y_1$-$y_N$), d) a measuring unit (M) connected to the outputs of said summing circuits (S1-SN) for measuring said summation signals giving corresponding measuring results, comparing each of said measuring results with one another and selecting the order number of one of said summation signals as a result of said comparing which corresponds to the output signal from the digital filter in said filter bank which best matches said transfer function, an address signal corresponding to said order number being delivered at an output of said measuring unit, and e) a memory unit (KM) storing a plurality of filter parameter groups ($C_{ij}$) each corresponding to the parameters of each said digital filter in said filter bank and which, in dependence on said address signal obtained from said measuring unit (M), transmits signals to the digital filter balancing impedance (B) representing a certain group of said parameter groups corresponding to said order number.

6. Arrangement as claimed in claim 5, wherein said measuring unit (M) includes means for measuring the energy of said summation signals to give said measuring results, and comparator means (JF) for carrying out said comparing of the measuring results, the order number being selected from the one of said results which indicate the least energy of said summation signals.

7. Arrangement as claimed in claim 6, wherein the measuring unit (M) contains a plurality of N multipliers (MU1 ... MUN) for forming the square of the signals (y1 ... yN) given by said summing circuits (S1 ... SN), a plurality N of accumulator circuits (ACC1 ... ACCN) for summing the signals (z1 ... zN) obtained from the multiplier circuits during a time corresponding to a plurality of periods of the periodic test signal, said comparator means (JF) comparing output signals (u1 .. . uN) from the accumulator circuits and giving said address signal to the memory unit (KM), which selects the one of said parameter groups (cij) in the memory unit which corresponds to said order number.

8. Arrangement as claimed in claim 7, wherein each said digital filter in said filter bank comprises a digital transversal filter containing M delay links (DL1 ... DLM), the input of each said digital filter as well as the output of each of the delay links being connected to digital multipliers, with fixed multiplying values determined from the impedance value of said subscriber lines connected to the subscriber units, the outputs of said multipliers being connected to a summator (S) the output of which forms one output from said filter bank.

* * * * *